United States Patent
Yokoyama

(10) Patent No.: US 11,404,988 B2
(45) Date of Patent: Aug. 2, 2022

(54) INVERTER CONTROL METHOD, AND INVERTER CONTROL APPARATUS

(71) Applicant: Nissan Motor Co., Ltd., Kanagawa (JP)

(72) Inventor: Nobuaki Yokoyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/963,986

(22) PCT Filed: Jan. 26, 2018

(86) PCT No.: PCT/JP2018/002494
§ 371 (c)(1),
(2) Date: Jul. 22, 2020

(87) PCT Pub. No.: WO2019/146076
PCT Pub. Date: Aug. 1, 2019

(65) Prior Publication Data
US 2021/0036645 A1     Feb. 4, 2021

(51) Int. Cl.
*H02P 1/00*     (2006.01)
*H02P 3/00*     (2006.01)
(Continued)

(52) U.S. Cl.
CPC ............. *H02P 27/06* (2013.01); *H02P 23/14* (2013.01)

(58) Field of Classification Search
CPC ................................. H02P 27/06; H02P 23/14
(Continued)

(56) References Cited

U.S. PATENT DOCUMENTS

2006/0119312 A1*   6/2006   Okamura ................ B60L 50/51
                                                             318/807
2009/0261774 A1* 10/2009   Yuuki .................. H02K 21/042
                                                             318/720
(Continued)

FOREIGN PATENT DOCUMENTS

JP         2005051892 A     2/2005
JP         2010246345 A   10/2010
(Continued)

OTHER PUBLICATIONS

International Search Report issued in International Application No. PCT/JP2018/002494, dated Apr. 10, 2018 (5 pages).
(Continued)

*Primary Examiner* — Erick D Glass
(74) *Attorney, Agent, or Firm* — Osha Bergman Watanabe & Burton LLP

(57) ABSTRACT

A control method of inverter for driving motor including a magnet, comprises detecting a rotation state of the motor by a rotation sensor, detecting current of the motor by a current sensor, calculating, based on a torque command value, a detection value of the rotation state detected by the rotation sensor, and detection current detected by the current sensor, a voltage command value for controlling a voltage of the motor by a controller for controlling the inverter, specifying a value of at least one of a local maximum value, a local minimum value, and an average value of the torque voltage command value included in the voltage command value as a torque determination target command value by the controller, comparing a demagnetizing determination threshold value with the torque determination target command value by the controller, and determining whether or not demagnetization of the magnet occurs in accordance with the compared result.

7 Claims, 12 Drawing Sheets

(51) Int. Cl.
*H02P 7/06* (2006.01)
*H02P 27/06* (2006.01)
*H02P 23/14* (2006.01)

(58) Field of Classification Search
USPC .......................................................... 318/494
See application file for complete search history.

(56) References Cited

U.S. PATENT DOCUMENTS

| 2011/0306389 | A1  | 12/2011 | Nagayama |            |
|--------------|-----|---------|----------|------------|
| 2014/0062362 | A1* | 3/2014  | Kawai    | H02P 3/22  |
|              |     |         |          | 318/400.22 |
| 2014/0285128 | A1* | 9/2014  | Ozaki    | H02K 7/10  |
|              |     |         |          | 318/400.13 |
| 2018/0269822 | A1* | 9/2018  | Aizawa   | H02P 29/662|

FOREIGN PATENT DOCUMENTS

| JP | 2010268599 A | 11/2010 |
| JP | 2011259253 A | 12/2011 |
| JP | 2014155294 A | 8/2014  |

OTHER PUBLICATIONS

International Preliminary Report on Patentability issued in International Application No. PCT/JP2018/002494; dated Nov. 6, 2018 (3 pages).

\* cited by examiner

INVERTER CONTROL METHOD, AND INVERTER CONTROL APPARATUS

The present invention relates to an inverter control method and an inverter control apparatus.

BACKGROUND ART

Conventionally, a motor control device is known. The motor control device determines whether a voltage command value Vq is lower than a predetermined threshold value, monitors the behavior of Vq when lowered, identifies that demagnetization of the motor occurs when Vq is steady (Patent Document 1).

PRIOR ART REFERENCE

Patent Document

[Patent Document 1] JP2011-259253A

SUMMARY OF INVENTION

Problems to be Solved by the Present Invention

However, when an operating point of driving varies, there is a difficulty that the demagnetization can not be accuracy well determined.

An object to be solved by the present invention is to provide an inverter control apparatus and a vehicle drive system capable of determining demagnetization when the operating point of driving varies.

Method for Solving the Problem

The present invention solves the above-described problem by specifying at least one of a local maximum value, a local minimum value, and an average value of the torque voltage command value included in voltage command value as a determination target command value, comparing the determination target command value with a demagnetizing determination threshold value, and determining whether demagnetization of the magnet occurs according to the compared result.

Effect of the Invention

According to the present invention, it is possible to determine the demagnetization when the operating point of the operation varies.

MODE(S) FOR CARRYING OUT THE INVENTION

Hereinafter, embodiments of the present invention will be described with reference to the drawings.

First Embodiment

Figure 1:
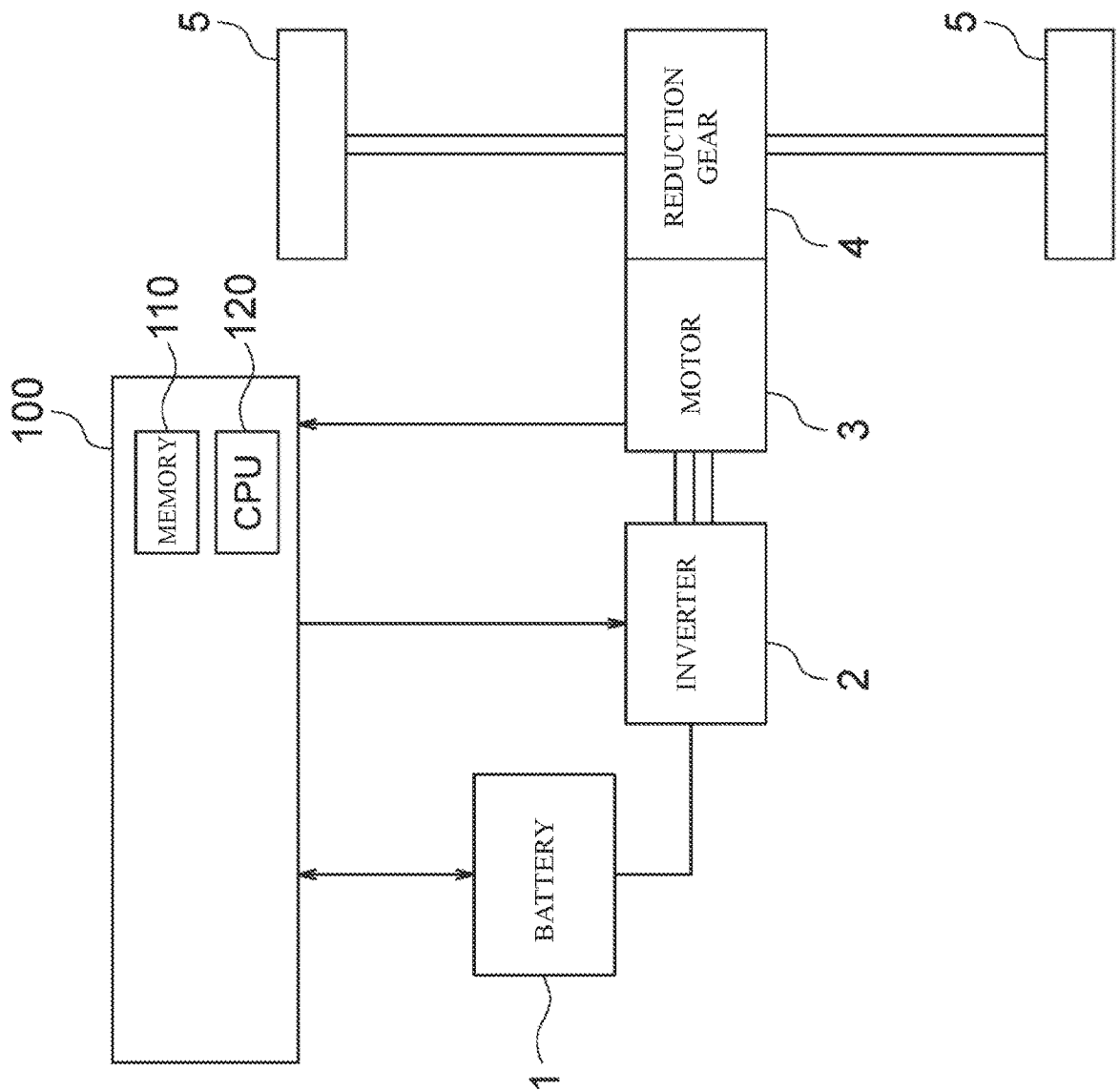
FIG. 1 is a block diagram of a vehicle drive system according to the present embodiment.

FIG. 1 is a block diagram showing a vehicle drive system including an inverter control apparatus according to an embodiment of the present invention. Hereinafter, the inverter control apparatus according to the present embodiment will be described with reference to an example provided to an electric vehicle, but the inverter control apparatus is also applicable to a hybrid vehicle with at least motor, for example, a parallel type hybrid vehicle and a series type hybrid vehicle.

As shown in FIG. 1, the vehicle control system including the inverter control apparatus according to the present embodiment has a battery 1, a inverter 2, a motor 3, a reduction gear 4, a drive wheel 5, and a controller 100, Incidentally, the vehicle drive system is not limited to the configuration shown in FIG. 1 and may include other configurations such as auxiliary instruments.

The battery 1 is a power source of vehicle, and a group of batteries in which a plurality of secondary batteries are connected in series or in parallel. A lithium ion battery or the like is used for the secondary battery. The inverter 2 includes a plurality of switching elements such as IGBT, by switching on/off of the switching elements based on switching signals from controller 100, converts AC power output from the battery 1 to DC power. Further, the inverter 2 converts the AC power generated by the regenerative operation of the motor 3 into DC power, and outputs the DC power to the battery 1. A current sensor is connected between the inverter 2 and the motor 3. The current sensor detects current flowing through motor 3 and outputs the detection value to the controller 100.

The motor 3 is a drive source of vehicle connected to the drive shaft of the vehicle. The motor 3 is driven by AC power from the inverter 2. The motor 3 is an electric motor such as a permanent-magnet synchronous motor. Further, the rotation angle sensor is connected to the motor 3, the rotation angle sensor outputs the detection value of the rotation angle to the controller 100. The output shaft of the motor 3 is connected to the right and left drive wheels 5 through the reducer 4 and the left and right drive shafts. The motor 3 regenerates energy by generating a regenerative driving force by rotating the drive wheels 5.

The controller 100 commands inverter 2 to output the driving torque (required torque) for outputting the torque in accordance with the driver's request, depending on vehicle status such as the accelerator position (APO) according to the driver's operation amount of the accelerator pedal, vehicle speed and slope, the SOC of the battery 1, the chargeable/dischargeable power of the battery 1, the generated power of motor 3, and the like. The demand of the driver is determined by the accelerator operation and the brake operation.

The controller 100 controls the motor 3 via inverter 2 while optimizing the efficiencies of vehicle drive system in accordance with the operating status of vehicle and the status of the battery 1. In FIG. 1, one controller 100 is illustrated as a control unit for controlling the vehicle, but the controller 100 may be a plurality of controller such as motor controller, integrated controller, or the like. Various controllers are connected via a CAN communication network. The controller 100 includes a memory 110, a CPU 120, and the like.

Figure 2:
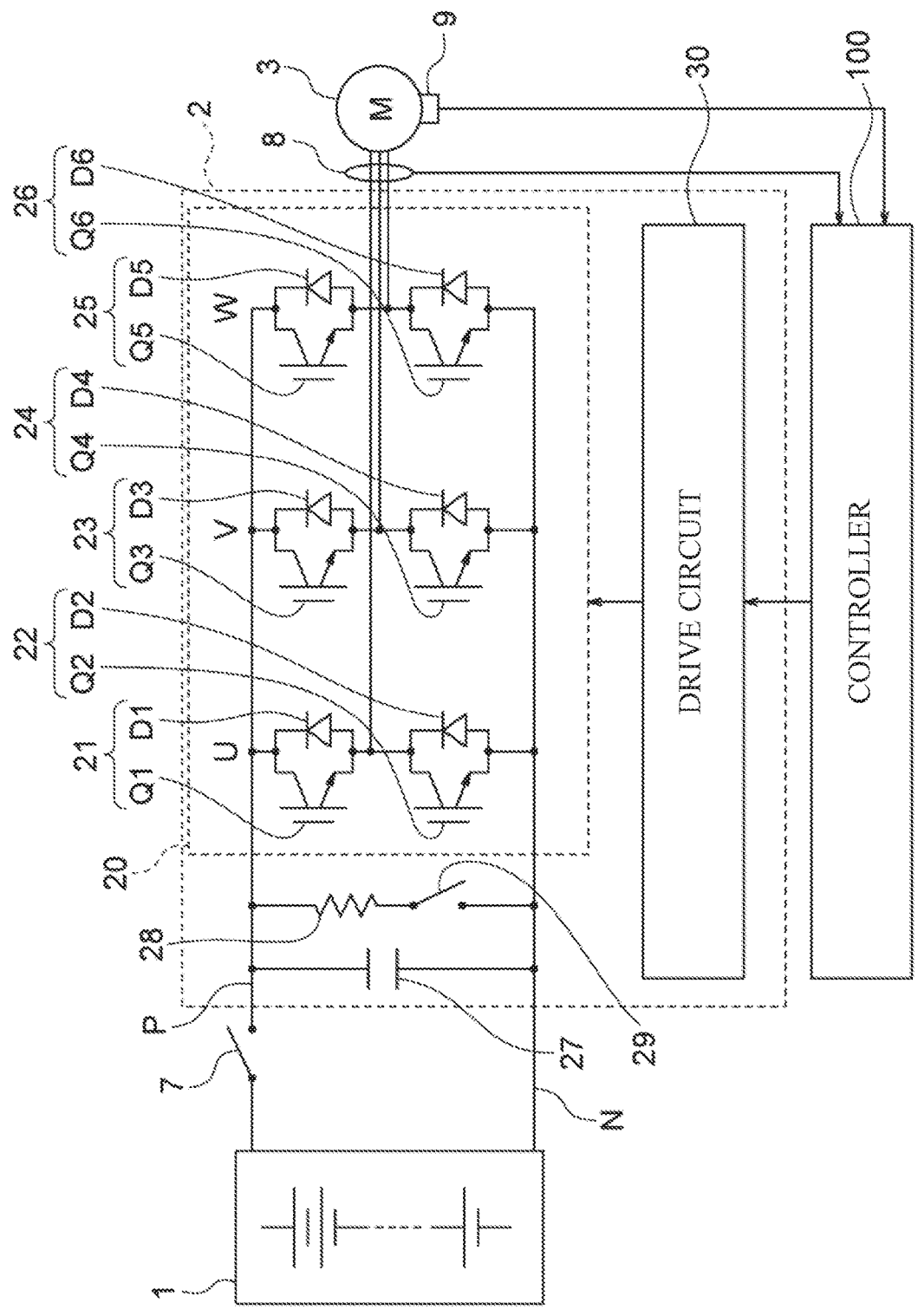
FIG. 2 is a block diagram of a drive system according to the present embodiment.

Next, a drive system of vehicle will be described with reference to FIG. 2. FIG. 2 is a block diagram of a drive system.

The inverter 2 includes an upper arm elements 21, 23, 25 forming the upper arm circuit, the lower arm elements 22, 24, 26 forming the under arm circuit, a smoothing capacitor 27, a discharging resistor 28, a discharging switch 29, and a drive circuit 30.

The main configurations of the upper arm elements 21, 23, 25 is a circuit in which switching element Q1, Q3, Q5 and diode D1, D3, D5 as a power device are connected in parallel, respectively. The collector terminal of the switching element Q1 and the cathode terminal of the diode D1 are connected, and the emitter terminal of the switching element Q1 and the anode terminal of the diode D1 are connected. The main configurations of the lower arm elements 22, 24, and 26 is a circuit in which switching element Q2, Q4, and Q6 and diode D2, D4, and D6 are connected in parallel, respectively. The connection between switching element Q2 to switching element Q6 and diode D2 to D6 is similar to the connection between switching element Q1 and diode D1.

In the present embodiment, three pairs of circuits in which two switching elements of switching elements Q1 to Q6 are connected in series are electrically connected to the battery 1 by being connected between the power supply line P and the power supply line N, and each connection point connecting switching elements of each pair and the three-phase output portion of the three-phase motor 3 are electrically connected, respectively. The power supply line P is connected to the positive electrode side of the battery 1, the power supply line N is connected to the negative electrode side of the battery 1.

A connection point between the emitter terminal of switching element Q1 and the collector terminal of switching element Q2 becomes the output of the U-phase, a connection point between the emitter terminal of switching element Q3 and the collector terminal of switching element Q4 becomes the output of the V-phase, a connection point between the emitter terminal of switching element Q5 and the collector terminal of switching element Q6 becomes the output of the W-phase, their connection points are connected to the three-phase wiring of motor 3. Then, two-level three-phase inverter circuitry 20 is configured by the upper arm elements 21, 23, 25 and the lower arm elements 22, 24, 26.

The smoothing capacitor 27 is a device is connected between the inverter circuitry 20 and the battery 1 to smooths power from battery 1. The smoothing capacitor 27 is connected between the power supply line P, N.

The discharge resistor 28 and the discharge switch 29 is connected in series, series circuit of the discharge resistor 28 and the discharge switch 29 is connected between the power supply line P, N. The discharge resistor 28 discharges the charges charged to the smoothing capacitor 27, The controller 100 controls on/off of the discharging switch 29. When the discharge switch 29 is turned on, the smoothing capacitor 27 and the discharge resistor 28 is conducted, the discharge is performed.

The drive circuit 30 is provided with a function of switching on and off of switching element S1 to S6 based on the switching signal transmitted from the controller 100.

The motor 3 is connected to the connection point of switching element Q1, Q2, the connection point of switching element Q3, Q4 and the connection point of switching element Q5, Q6 in each phase of inverter circuits.

The relay switch 7 is connected between the battery 1 and the smoothing capacitor 27 of inverter 2.

The controller 100 is a controller for controlling the drive circuitry 30. The controller 100 calculates a current command value of the inverter 2 for outputting the required torque of torque command value from motor 3 based on the torque command value inputted externally, phase current of the motor 3, and rotation speed (Number of rotations) of the motor 3, Incidentally, the phase current of motor 3 is detected by the current sensor 8 connected between the inverter circuit 20 and the motor 3, and the rotation speed of motor 3 is calculated from the detection value of the resolver 9 provided in motor 3.

Then, the controller 100 generates a switching signal for supplying power required by motor 3, and outputs the switching signal to the drive circuit 30. Then, the drive circuit 30, based on the switching signal, turns on and off the respective switching element Q1 to Q6. Thus, the controller 100 controls inverter 2 by PWM control.

Figure 3:
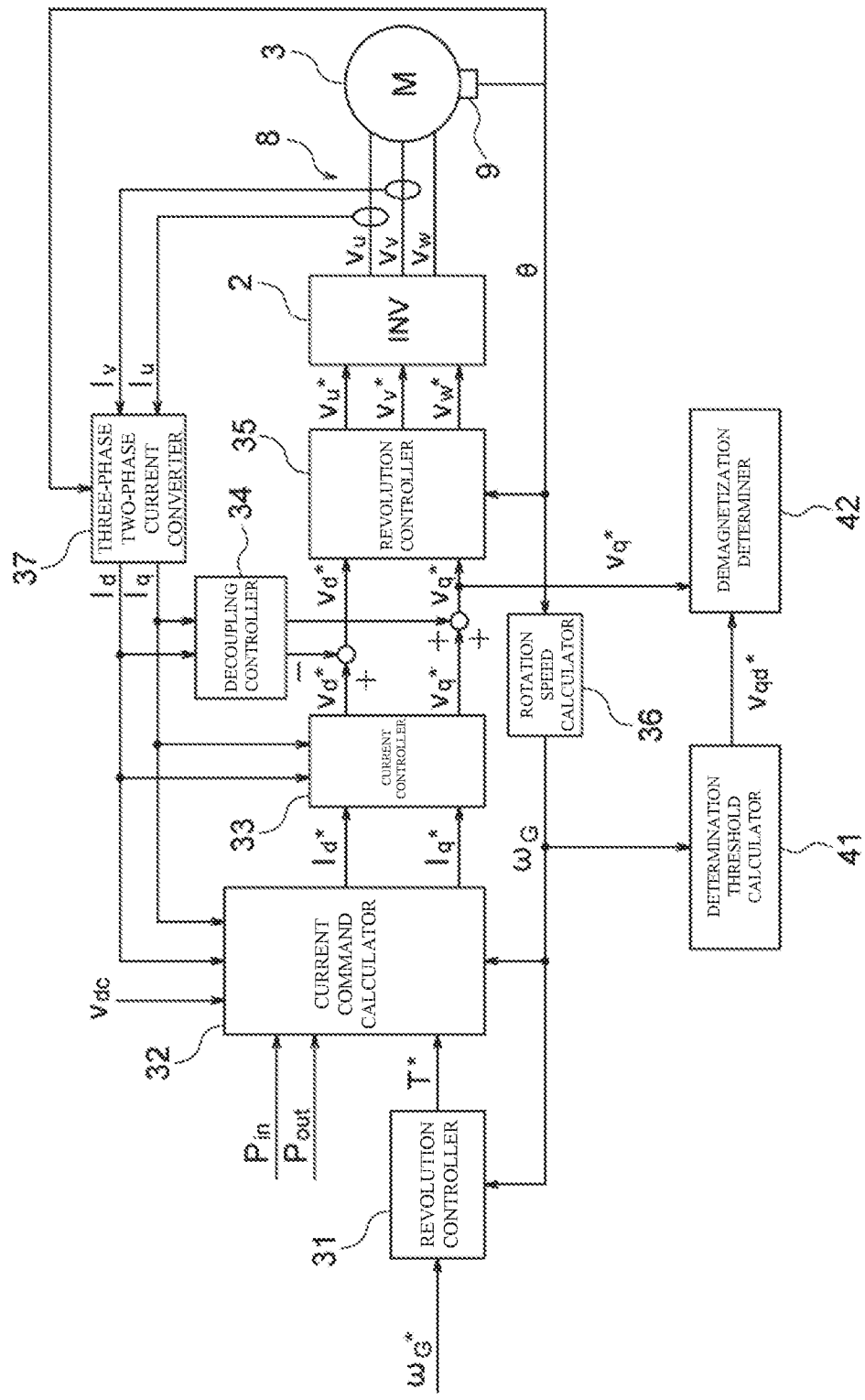
FIG. 3 is a block diagram of an inverter control apparatus according to the present embodiment.

Next, with reference to FIG. 3, a control block in accordance with the control of inverter of controller 100 will be described. FIG. 3 is a block diagram of inverter 2, motor 3, and controller 100. The controller 100 has a rotation speed controller 31, a current command value calculator 32, a current controller 33, a non-interference controller 34, a two-phase three-phase voltage converter 35, a rotation speed calculator 36 and a three-phase two-phase current converter 37.

The rotation speed controller 31 is a PID controller for calculating torque command value (T*) of motor 3 so that the rotation speed detection value ($\omega_G$) outputted from the rotation speed calculator 36 coincides with the rotation speed command value ($\omega_G^*$) of motor 3 outputted from controller 100. The rotation speed command value ($\omega_G^*$) and the rotation speed detection value ($\omega_G$) are inputted to the rotation speed controller 31. The rotation speed controller 31 uses the inputted value ($\omega_G^*$, $\omega_G$) to calculate a torque command value (T*) by the following equation (1), and outputs the calculated torque command value to the current command value calculator 32

[Expression 1]

$$T^* = \left(K_P + \frac{K_I}{s} + \frac{K_B \cdot s}{T_D + 1}\right) \cdot \omega_G^* - \omega_G \qquad (1)$$

Note that, $K_p$ is a proportional gain, $K_I$ is an integration gain, $K_D$ is a differential gain, $T_D$ is a time constant of approximate differential, s is Laplace operator, $\omega_G$ is a rotation speed detection value, and $\omega_G^*$ is a rotation speed command value. The rotation speed command value ($\omega_G^*$) is a target value to be calculated by controller 100. The controller 100 calculates the target torque corresponding to the request of user in accordance with the vehicle status, and the rotation speed required to output the target torque as a rotation speed command value.

In the current command value calculator 32, torque command value (T*), the voltage ($V_{dc}$) of the battery 1, the rotation speed detection value ($\omega_G$) indicating the angular frequency of the motor 3 are inputted. The current command value calculator 32 calculates the dq-axis current command value ($I_d^*$, $I_q$) of the motor 3 and outputs the calculated dq-axis current command value to the current controller 33. The dq-axis represents the axis of the rotating coordinate system formed by making the magnetic flux axis and the magnet axis orthogonal. The torque command value (T*), the rotation speed detection value ($\omega_G$), and the voltage ($V_{dc}$) are inputted to the current command value calculator 32. The current command value calculator 32 stores a map and outputs the dq-axis current command value ($I_d^*$, $I_q^*$). The map is associated with outputting the optimum command value to minimize the loss of the inverter 2 and motor 3 against to the input of the torque command value (T*), the rotation speed detection value ($\omega_G$), and the voltage ($V_{dc}$). The current command value calculator 32 calculates the dq-axis current command value ($I_d^*$, $I_q^*$) with reference to the map.

Further, in the current command value calculator 32, the dq-axis current ($I_d$, $I_q$) based on the detection value of current sensor 8 and the chargeable and dischargeable power ($P_{in}$, $P_{out}$) of the battery 1 are inputted in addition to the torque command value (T*), the voltage (Vdc) and the rotation speed detection value ($\omega_G$). The current command value calculator 32 calculates the dq-axis current command value. The dq-axis current command value is a target value of current of motor 3, including the excitation current command value and the torque current command value.

In the current controller 33, the dq-axis current command value ($I_d^*$, $I_q^*$) and dq-axis current (Id, Iq) are inputted. The current controller 33 performs a control operation with the following equation (2) and outputs a dq-axis voltage command value (vd*, vq*). The dq-axis voltage command value (vd*, vq*) is a voltage target of motor 3, including an energized voltage command value and a torqued voltage command value.

[Expression 2]

$$v_d^* = \left(K_{pd} + \frac{K_{id}}{s}\right) \cdot (I_d^* - I_d)$$

$$v_q^* = \left(K_{pq} + \frac{K_{iq}}{s}\right) \cdot (I_p^* - I_p) \qquad (2)$$

Note that, $K_{pd}$ and $K_{pq}$ indicate proportional gains, and $K_{id}$ and $K_{iq}$ indicate integration gains.

Incidentally; the current controller 33 may calculate the dq-axis voltage command value ($v_d^*$, $v_q^*$) by referring to the map corresponding to the above equation (2).

Non-interference controller 34, when current flows in the d-axis and q-axis of motor 3, calculates the dq-axis non-interference voltage ($v_{ddcpl}$, $v_{qdcpl}$) for canceling the interference voltage generated. The equation for motor 3, expressed in terms of dq coordinate, is generally expressed by the following equation (3).

[Expression 3]

$$\begin{pmatrix} v_d \\ v_q \end{pmatrix} = \begin{pmatrix} R_a + pL_d & -\omega_{re}L_q \\ \omega_{re}L_d & R_a + pL_q \end{pmatrix} \begin{pmatrix} I_d \\ I_q \end{pmatrix} + \begin{pmatrix} 0 \\ \omega_{re}\Phi_a \end{pmatrix} \qquad (3)$$

Note that, $L_d$ indicates a d-axis inductance, $L_q$ indicates a q-axis inductance, $R_a$ indicates a winding resistance of motor 3, $\omega_{re}$ indicates an electric angular velocity, $\varphi_a$ indicates a magnetic flux density (torque constant), and p indicates a differential operator.

When the equation (3) is transformed by dividing it into each component, this equation is expressed by the following equation.

[Expression 4]

$$I_d = G_{pd}(v_d + \omega_{re}L_qI_q)$$

$$I_q = G_{pq}(v_q - \omega_{re}(L_dI_d + \Phi_a)) \qquad (4)$$

Note that, current response-model $G_{pd}$ is expressed by the following equation.

[Expression 5]

$$G_{pd}(s) = \frac{1}{L_ds + R_a}$$

$$G_{pq}(s) = \frac{1}{L_qs + R_a} \qquad (5)$$

As shown in equation (3), there is a velocity electromotive force interfering between the dq-axis, the non-interference controller 34 to cancel this interfering, and calculates the non-interference voltage ($v_{ddcpl}$, $v_{qdcpl}$) represented by the following equation (6).

[Expression 6]

$$v_{ddcpl} = \omega_{re}L_qI_q$$

$$v_{qdcpl} = \omega_{re}(L_dI_d + \Phi_a) \qquad (6)$$

A subtractor is provided on the output side of the current controller 33 and the non-interference controller 34, and in the subtractor, the interference term of the expression (4) is canceled by subtracting the non-interference voltage ($v_{ddcpl}$, $v_{qdcpl}$) indicated by the expression (6) from voltage command value ($v_d^*$, $v_q^*$), and the dq-axis current is expressed by the following expression (7).

[Expression 7]

$$I_d = G_{pd} \cdot v_d^*$$

$$I_q = G_{pq} \cdot v_q^* \qquad (7)$$

In the two-phase three-phase voltage converter 35, the dq-axis voltage command value ($v_d^*$, $v_q^*$) and the detection value (θ) of the resolver 9 are inputted. The two-phase three-phase voltage converter 35 converts the dq-axis voltage command value ($v_d^*$, $v_q^*$) of the rotating coordinate system into the voltage command value ($v_u^*$, $v_v^*$, $v_w^*$) of the u, v, and w axes of the fixed coordinate system using the following equation (8) and outputs the converted voltage command value to inverter 2.

[Expression 8]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^* \\ v_q^* \end{bmatrix} \quad (8)$$

The three-phase two-phase current converter 37 is a control unit for performing a three-phase two-phase conversion. In the three-phase two-phase current converter 37, the phase current ($I_u$, $I_v$, $I_w$) and the detection value ($\theta$) are inputted. The three-phase two-phase current converter 37 converts the phase current ($I_u$, $I_v$, $I_w$) of the fixed coordinate system to the phase current ($I_d$, $I_q$) of the coordinate system and outputs the converted current to the current command value calculator 32, the current controller 33 and the non-interference controller 34.

The current sensor 8 is provided in each of the U-phase and V-phase, detects the phase current (Iu, Iv), and outputs the detected current value to the three-phase two-phase current converter 37. Current of the w-phase is not detected by current sensor 8, instead, the three-phase two-phase current converter 37, based on the input phase current (Iu, Iv), calculates the phase current of the w-phase.

The resolver (rotation sensor) 9 is provided in motor 3. The resolver (rotation sensor) 9 is a detector for detecting position of the magnetic poles of motor 3 and outputs the detection value ($\theta$) to the rotation speed calculator 36. The resolver 9 detects a rotation state of motor 3 in predetermined period. The rotation speed calculator 36 calculates the rotation speed detection value which is an angular frequency of motor 3 with the detection value ($\theta$) of the resolver 9, and outputs the calculated detection value to the rotation speed controller 31 and the current command value calculator 32.

By inputting the phase current ($I_d$, $I_q$) to the current controller 33, the control device executes control under a current control loop having a predetermined gain. The inverter 2 generates a PWM control signal that switches switching element on/off based on the input voltage command value ($v^*_u$, $v^*_v$, $v^*_w$) under control of current control loop. Based on the PWM control signal, switching element is operated to convert the power.

The decision threshold calculator 41 calculates a determination threshold ($v_{qd}^*$) for determining the demagnetization. The demagnetization determiner 42 compares the voltage command value ($v_q^*$) with the determination threshold ($v_{qd}^*$) and determines whether or not demagnetization of the magnetic included in motor 3 occurs. Incidentally, the determination method of demagnetizing determination by the determination threshold calculator 41 and the demagnetization determiner 42 will be described later.

Incidentally, in the permanent magnet type synchronous motor of motor 3, for example, a strong magnet such as neodymium magnet is used. Although this magnet obtains a magnetic force by magnetizing, it becomes impossible to hold the magnetic force when applying an excessive magnetic force in the opposite direction. This phenomenon is demagnetization. When the demagnetization occurs in vehicle drive motor, the torque to drive vehicle is decreased because the magnetic force of the motor is weak even though current is flowing through the motor.

Since the demagnetization affects voltage command value ($v_q^*$), it is possible to determine the demagnetization from the change of voltage command value ($v_q^*$). As shown in the above equation (3), the torque voltage ($v_q$) changes depending on the rotation speed of motor 3, so that the voltage command value ($v_q^*$) also changes depending on motor rotation speed. The rotations of motor vary depending on vehicle status, driver's operation, etc., and are not stationary, Therefore, the voltage command value ($v_q^*$) is not a constant. The decreasing of the voltage command value ($v_q^*$) is caused not only by demagnetizing but also by changing motor rotation speed.

Figure 4:
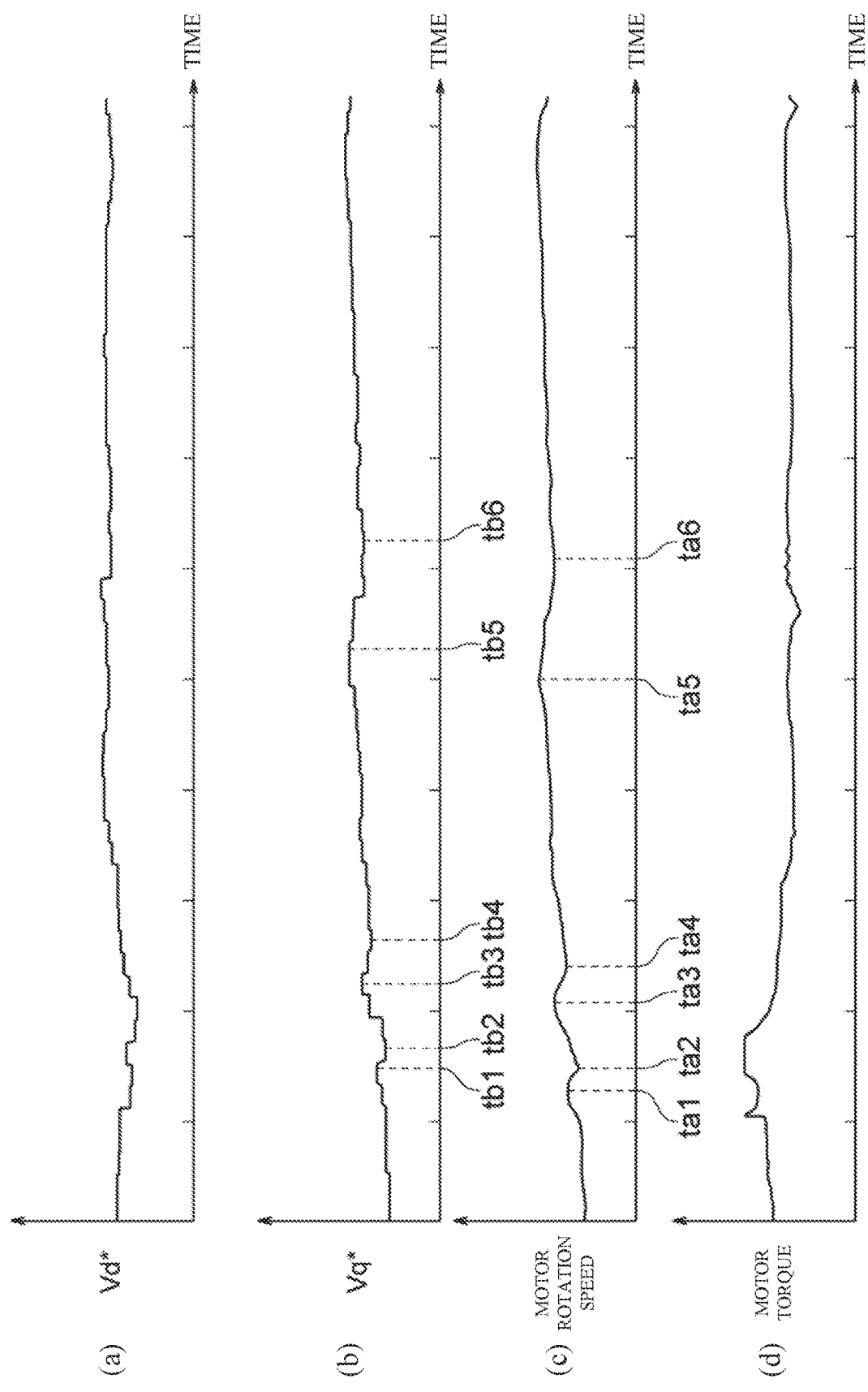
FIG. 4 is a graph showing the characteristics of the voltage command value ($v_p^*$), the characteristics of the voltage command value ($v_q^*$), the characteristics of a motor rotation speed, and the characteristics of the motor torques.

Referring to FIG. 4, a correlation between voltage command value (vq*) and a motor rotation speed will be described. FIG. 4 is a graph showing the characteristics of voltage command value ($v_p^*$), the characteristics of voltage command value ($v_q^*$), the characteristics of motor rotation speed, and the characteristics of the motor torques. The horizontal axis shows time.

As shown in graphs (b) and (c), the voltage command value ($v_q^*$) changes to follow motor rotation speed. When the motor rotation speed changes to either the local maximum or the local minimum at times $t_{a1}$, $t_{a2}$, $t_{a3}$, $t_{a4}$, $t_{a5}$, and $t_{a6}$, the voltage command value ($v_q^*$) also changes to either the local maximum or the local minimum at times $t_{b1}$, $t_{b2}$, $t_{b3}$, $t_{b4}$, $t_{b5}$, and $t_{b6}$. Therefore, the time $t_{a1}$ when the motor rotation speed reaches the local maximum point corresponds to the time $t_{b1}$ when the voltage command value reaches the local maximum point, the time $t_{a2}$ when the motor rotation speed reaches the local minimum point corresponds to the time $t_{b2}$ when the voltage command value reaches the local minimum point, and the times $t_{a1}$, $t_{a4}$, $t_{a5}$, and $t_{a6}$ when the motor rotation speed reaches the local maximum or minimum points correspond to the times $t_{b3}$, $t_{b4}$, $t_{b5}$, and $t_{b6}$ when the voltage command value reaches the local maximum or minimum points, respectively. In the present embodiment, using such the relationship between the voltage command value ($v_q^*$) and the motor rotation speed, under the state in which the operating point of driving changes, the determination of demagnetizing is performed.

Figure 5:
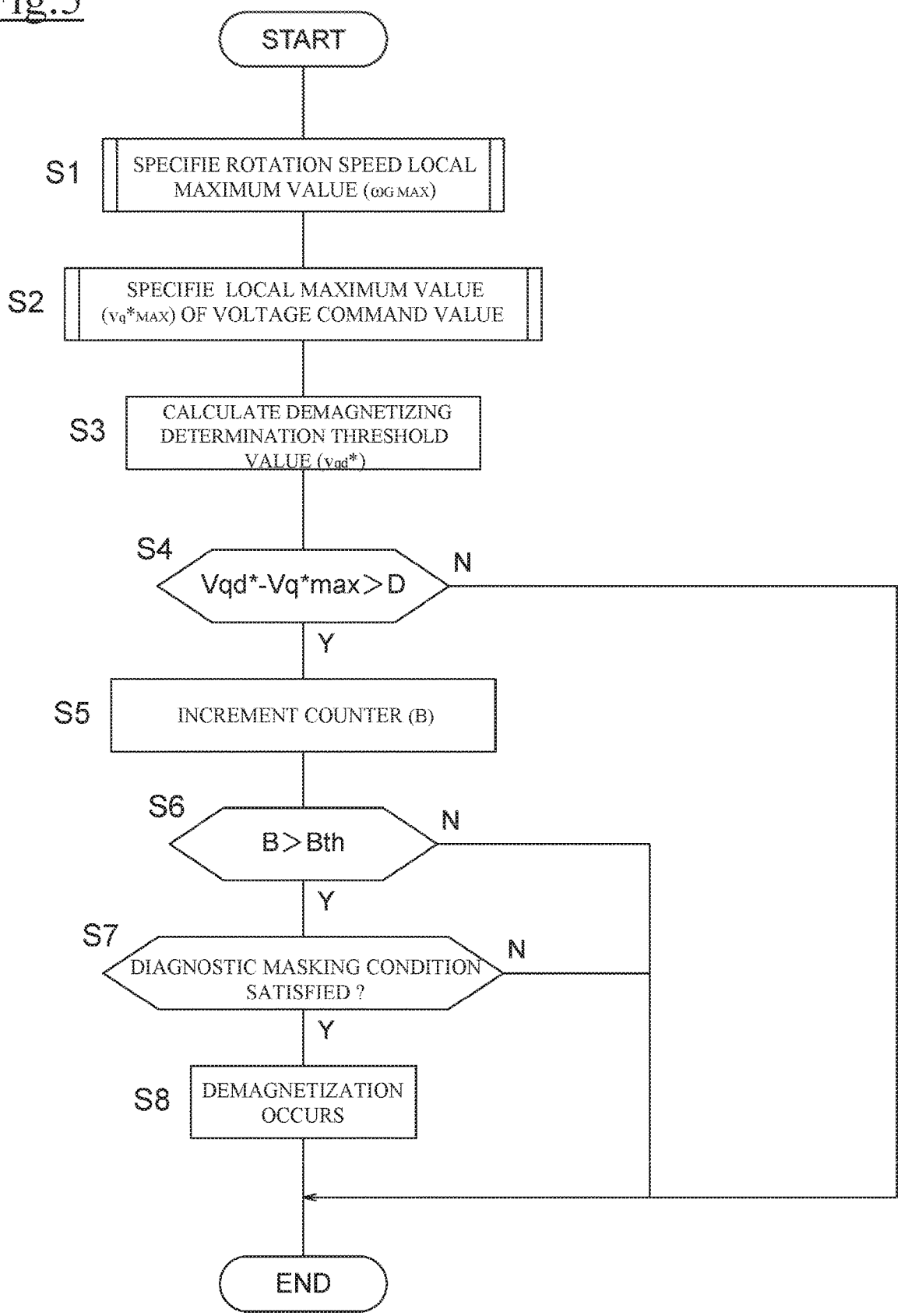
FIG. 5 is a flowchart showing a control flow of demagnetizing determination by controller shown in FIG. 3.

Next, with reference to FIG. 5, the control of the demagnetizing determination by controller 100 will be described. FIG. 5 is a flowchart showing a control flow of the demagnetizing determination by controller 100. The control flow illustrated in FIG. 5 is repeatedly executed at a predetermined period. Control period of the control flow, with respect to the time the rotation speed varies (corresponding to the operation period of vehicle), it may be a sufficiently small period (e.g., 10 ms).

Figure 6:
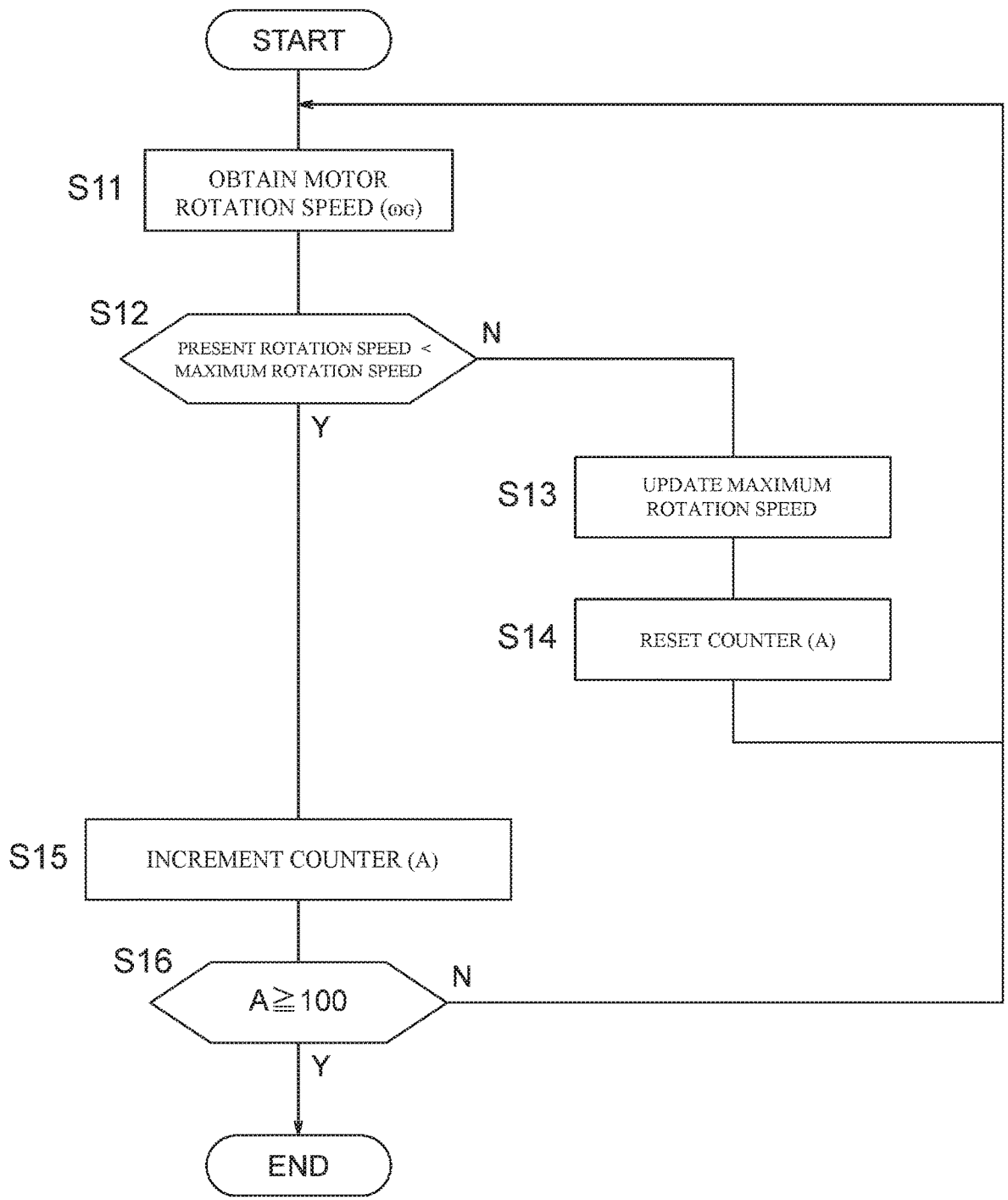
FIG. 6 is a flow chart showing the control flow of step S1 of FIG. 5.

In step S1, the demagnetization determiner 42 specifies the rotation speed local maximum value ($\omega_{G\ MAX}$) is the local maximum value of motor rotation speed ($\omega_G$). Detailed control process of step S1 will be described with reference to FIG. 6. FIG. 6 is a flow chart showing the control process of step S1. In step S11, the demagnetization determiner 42 obtains motor rotation speed ($\omega_G$) from the rotation speed calculator 36. The demagnetization determiner 42 compares the present motor rotation speed ($\omega_G$) with the maximum rotation speed. The present motor rotation speed ($\omega_G$) are obtained by the control process of step S11. Initial value of the maximum rotation speed may be the motor rotation speed ($\omega_G$) first obtained in the control flow shown in FIG. 5.

In step S12, the demagnetization determiner 42 compares the present rotation speed with the maximum rotation speed. When the present rotation speed is equal to or higher than the maximum rotation speed, the process proceeds to step S13. When the present rotation speed is lower than the maximum rotation speed, the process proceeds to step S15. In step S13, the demagnetization determiner 42 updates the maximum rotation speed by setting the present rotation speed to a new maximum rotation speed. In step S14, the counter A is reset; and the process returns to step S11. That is, while motor rotation speed is increasing, the demagnetization determiner 42 updates the maximum rotation speed by repeatedly executing the control loops from step S11 to step S14, When the present rotation speed becomes lower than the updated maximal rotation speed, the process proceeds to step S15.

In step S15, the demagnetization determiner 42 increments the counter A. In step S16, the demagnetization determiner 42 determines whether or not the counter A is equal to or greater than 100. When determining that the counter A is less than 100, the process returns to step S11. When the counter A is determined to be 100 or more, the control flow shown in FIG. 6 terminates. In the case in which the control process shown in FIG. 6 are executed for example every 10 ms, when the maximum rotation speed is not updated while counting 100 time points continuously from the point at which the present rotation speed is lower than the maximum rotation speed, the demagnetization determiner 42 determines that the local maximum value of the motor rotation speed is obtained and sets the present maximum rotation speed to the local maximum rotation speed ($\omega_{G\_MAX}$).

Returning to FIG. 5, in step S2, the demagnetization determiner 42 specifies the local maximum value ($v_q^*{}_{MAX}$) of the voltage command value. The local maximum value ($v_q^*{}_{MAX}$) of the voltage command value can be specified by executing a control flow in which the rotation speed is replaced with voltage command value in the control flow shown in FIG. 6.

In step S3, the determination threshold calculator 41 calculates the demagnetizing determination threshold value ($v_{qd}^*$) corresponding to the rotation speed maximum value ($\omega_{G\_MAX}$). Demagnetizing determination threshold value ($v_{qd}^*$) is a threshold for determining the demagnetizing and the demagnetizing determination threshold value ($v_{qd}^*$) is a value corresponding to motor rotation speed ($\omega_G$). Memory 110 stores a map in which motor rotation speed ($v_{qd}^*$) and demagnetizing determination threshold value (G) are associated. That is, the determination threshold value ($v_{qd}^*$) shown in the map is also different value when the rotation speed maximum value ($\omega_{G\_MAX}$) changes. The determination threshold calculator 41, while referring to the map, specifies the determination threshold value ($v_{qd}^*$) corresponding to the rotation speed maximum value ($\omega_{G\_MAX}$).

In step S4, the demagnetization determiner 42 calculates a difference ($v_{qd}^* - v_q^*{}_{MAX}$) between the determination threshold value ($v_{qd}^*$) specified on the map and the local maximum value $v_q^*{}_{MAX}$) of voltage command value, and compares the calculated difference with a predetermined threshold value (D). A predetermined threshold (D) indicates a reduction amount of voltage command value ($v_q^*$) reduced by demagnetization, and is set in advance.

When the difference is greater than the threshold (D), the determination device 42 determines that the maximum value ($v_q^*{}_{MAX}$) of the voltage command value is lower than the normal value, the process proceeds to step S5 control. On the other hand, when the difference is less than the threshold value (I)), the demagnetization determiner 42 determines that the demagnetization does not occur, and terminates the control flow shown in FIG. 5.

In step S5, the demagnetization determiner 42 increments the counter (B). In step S6, the demagnetization determiner 42 compares the counters (B) with the thresholds ($B_{th}$). Threshold ($B_{th}$) indicates the number of times of determination times determined to be abnormal, is determined according to the determination accuracy of demagnetize. Threshold ($B_{th}$) is predetermined, for example, is set to 3 times.

In step S7, the demagnetization determiner 42 determines whether or not the diagnostic masking condition is satisfied. Diagnostic mask condition, used for demagnetization diagnostics, the calculated value of motor rotation speed (corresponding to the detection value of the resolver 9) is a condition for determining whether a value suitable for diagnostics. For example, it is an example of a diagnostic masking condition that there is no abnormality in current sensor 8 or that there is no abnormality in the CPUs included in controller 100. For example, when an abnormality occurs in current sensor 8, or when an abnormality occurs in the CPU included in controller 100, the calculated motor rotation speed may be lower than the actual rotation speed. Therefore, when it is determined that the diagnostic mask condition is not satisfied, the demagnetization determiner 42 terminates the control flow shown in FIG. 5. On the other hand, when determining that the diagnostic masking condition is satisfied, in step S8, the demagnetization determiner 42 determines that demagnetization occurs. The controller 100 notifies the drivers of the occurrence of demagnetization.

As described above, in the present embodiment, the controller 100 calculates the voltage command value for controlling the voltage of motor 3 based on the detection value of rotation state detected by the resolver 9, the torque command value, and the detection value of current detected by current sensor 8, specifies the local maximum value of the torque voltage command value included in the voltage command value as determination target command value, compares the determination target command value with the demagnetizing determination threshold value, and determines whether or not demagnetization of the magnet occurs in accordance with the compared result. Thus, it is possible to determine the demagnetization even when the operating point of motor 3 varies.

As a mechanism of the magnet demagnetization, the demagnetization occurs when the reverse magnetic field exceeds the knick point. Then, when the reverse magnetic field exceeds the knick point, the magnetic force decreases steeply, the degree of decrease in the rotation speed is large. In the present embodiment, since relationship between voltage command value (vq*) and motor rotation speed is utilized, when demagnetization such as exceeding the knick point occurs, the effect of demagnetization appears in the change of the local maximum value of voltage command value ($v_q^*$). Thus, in the present embodiment, in a system in which motor rotation speed varies as in vehicle drive system, it is possible to diagnose the occurrence of demagnetization at a high accuracy.

In this embodiment, the controller 100 also obtains motor rotation speed corresponding to the local maximum value of voltage command value ($v_q^*$) and sets demagnetizing determination threshold value based on the obtained motor rotation speed. Thus, it is possible to increase accuracy of the demagnetizing determination.

As a modification of the present embodiment, instead of the local maximum value of motor rotation speed, a local minimum value of motor rotation speed may be used. Specifically, in the control flows of step S1 shown in FIG. 5, the controller 100 specifies the local minimum rotation speed ($\omega_{G\_MIN}$). In the control flow of step S2, the local minimum value ($v_q^*_{MIN}$) of voltage command value is specified. In the control flow shown in FIG. 6, the maximum motor rotation speed may be replaced with the minimum motor rotation speed or the minimum voltage command value, and the magnitude relationship of the determination flow of step S12 is reversed in order to specify the local minimum rotation speed minimum value ($\omega_{G\_MIN}$) or the local minimum voltage command value ($v_q^*_{MIN}$). Then, the demagnetization may be diagnosed so that the controller diagnoses the occurrence of demagnetization by executing the same control after the step S3 as shown in FIG. 5.

In a modification of the present embodiment, the controller 100 specifies the local minimum value of the torque voltage command value included in voltage command value as determination target command value, and compares determination target command value with demagnetizing determination threshold value to determine whether demagnetization of the magnets occurs in accordance with the compared result. Thus, it is possible to determine the demagnetization even when the operating point of motor 3 varies.

Further, as another modification of the present embodiment, instead of the local maximum value of motor rotation speed, an average value of motor rotation speed may be used. Specifically, in the control flow of step S1 shown in FIG. 5, the rotation speed mean value ($\omega_{G\_AVE}$) is specified. In the control flow of step S2, the average value ($v_q^*_{AVE}$) of the voltage command value is specified. The rotation speed maximum value ($\omega_{G\_MAX}$) and the rotation speed local minimum value ($\omega_{G\_MIN}$) are specified in the same manner as described above and the average value of these two values is the average ($\omega_{G\_AVE}$) of the rotation speed. Further, the local minimum value ($v_q^*_{MIN}$) of voltage command value ($v_q^*_{MAX}$) are specified and the average value of these two values is the average value ($v_q^*_{AVE}$) of voltage command value. Then, the demagnetization may be diagnosed by executing the same control as in step S3 and subsequent steps shown in FIG. 5. Then, the demagnetization may be diagnosed so that the controller diagnoses the occurrence of demagnetization by executing the same control after the step 3 as shown in FIG. 5

In a modification of the present embodiment, the controller 100 specifies the average value of the torque voltage command value included in the voltage command value as determination target command value, and compares the determination target command value with the demagnetizing determination threshold value to determine whether demagnetization of the magnets occurs according to the compared result, Thus, it is possible to determine the demagnetization even when the operation point of motor 3 varies.

Incidentally, the determination threshold calculator 41, substitute of the calculation process using the map, for example, the moving average value of the torque voltage command value ($v_q^*$) may be calculated as a determination threshold ($v_{qd}^*$), The determination threshold calculator 41 may calculate the determination threshold ($v_{qd}^*$) by calculation process using an expression in which the motor rotation speed is variable, instead of the moving average.

Second Embodiment

Inverter control method and inverter control apparatus according to another embodiment of the present invention will be described. In the present embodiment, with respect to the first embodiment, it differs in that a part of the control flows of the demagnetizing determination is added. Other configurations and control method are the same as the first embodiment described above, and the description thereof is incorporated.

Figure 7:
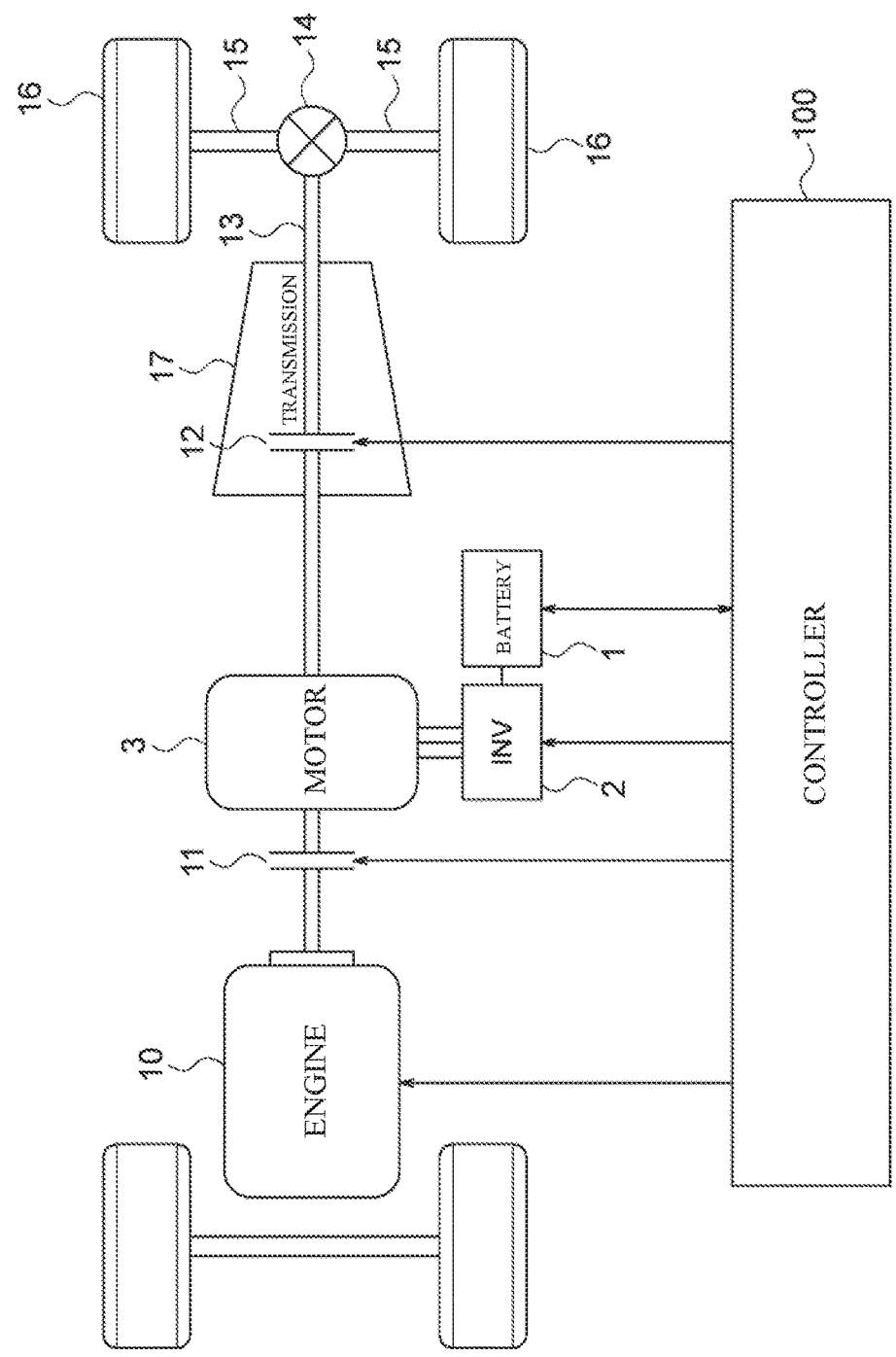
FIG. 7 is a block diagram of a vehicle drive system according to another embodiment of the present invention.

FIG. 7 is a block diagram of a vehicle drive system according to the present embodiment. Inverter control apparatus according to this embodiment is applied to a vehicle drive system shown in FIG. 7.

The hybrid vehicle is a parallel type vehicle in which a plurality of power sources, such as an internal combustion engine and an electric motor generator, are used to drive vehicle, and includes a battery 1, an inverter 2, a motor 3, right and left drive wheels 5, an internal combustion engine (hereinafter referred to as an engine) 10, a first clutch 11, a second clutch 12, a propeller shaft 13, a differential gear unit 14, a drive shaft 15, and an automatic transmission 17.

The first clutch 11 is interposed between the output shaft of the engine 10 and the rotary shaft of motor 3 to connect and disconnect (ON/OFF) the power transmission between the engine 10 and the motor 3. As the first clutch 11, a wet multi-plate clutch or the like that can continuously control the oil flow rate and the hydraulic pressure with a proportional solenoid can be exemplified. In the first clutch LI, the hydraulic pressure of the hydraulic unit is controlled based on the control signal from the controller 100, thereby fastening (including slipping) or releasing the clutch plate of the first clutch 11. A dry clutch may be employed for the first clutch 11.

The automatic transmission 17 is a stepped transmission in which the transmission ratios such as the forward seven-speed gear and the backward one-speed gear are switched stepwise, and the transmission ratios are automatically switched according to vehicle speed, the degree of acceleration, and the like.

The second clutch 12 may utilize several friction fastening elements among a plurality of friction fastening elements fastened at each transmission stage of the automatic transmission 17. Alternatively, the clutch may be a dedicated clutch different from the second clutch 7.

The output shaft of the automatic transmission 17 is connected to the right and left drive wheels 5 through a propeller shaft 13, a differential gear unit 14, and the right and left drive shafts 15. Incidentally, the right and left drive wheels 5 in FIG. 7 are front wheels.

The controller 100 connects the clutches 12 and rotates the drive wheels 5 with the driving force of motor 3 to drive vehicle. Also, when, for example, requiring the output of the engine 10 by the driver's operation, the controller 100 connects the clutches 11 and starts the engine with the driving force of motor 3. At this time, when demagnetization occurs with the magnet included in motor 3, even if current is applied to motor 3, the engine 10 does not start because an appropriate torque is not output from motor 3. In order to start the engine 10, it is necessary to increase current of motor 3 to increase the output torque of motor 3, so that the engine start time becomes longer.

Figure 8:
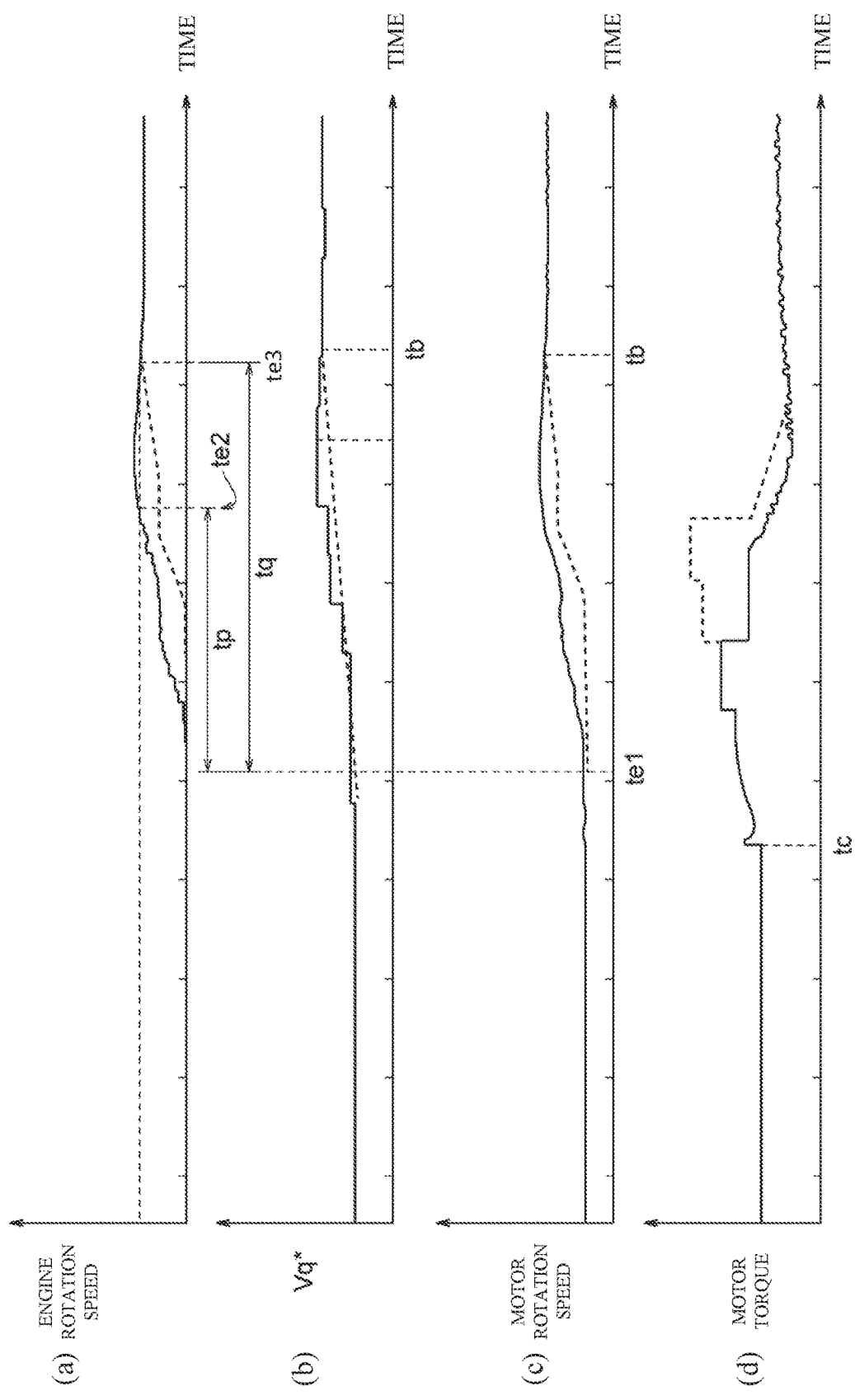
FIG. 8 is graphs showing the characteristics of the engine speed, the characteristics of the voltage command value ($v_q^*$), the characteristics of the motor rotation speed, and the characteristics of the motor torque command value.

FIG. 8 is a graph showing the characteristics of the engine speed, the voltage command value ($v_q^*$), the motor rotation speed, and the motor torque command value. The horizontal axis shows time. Solid lines show the characteristics at normal, dotted lines show the characteristics at the time that the demagnetization occurs.

At the time $t_c$, the controller 100 launches torque command value to start the engine. As torque command value increases, the motor rotation speed increases, the voltage command value ($v_q^*$) increases, and the engine speed also increases. At the time of the time $t_{e1}$, an increase in engine rotation speed starts at the time $t_{e1}$, and the engine is in a state of complete explosion at the time of $t_{e2}$. The start times of the engine is $t_p$.

On the other hand, when the demagnetization occurs, even if the motor torque command value increases, since motor rotation speed does not increase significantly, the controller 100 further increases the motor torque command value. The engine speed gradually increases from the time $t_{e1}$, but it takes time to increase the engine speed, and the engine is in a state of complete explosion at $t_{e3}$. The start time of the engine is $t_q$ ($>t_p$). That is, when the demagnetization occurs, the start time of the engine becomes longer.

The time $t_a$ of the local maximum point of motor rotation speed corresponds to the time tb of the local maximum point of the voltage command value ($v_q^*$), and the voltage command value ($v_q^*$) changes to follow the motor rotation speed. In the present embodiment, in the following control flow, the condition of the start time of the engine is added to the determination logic of the demagnetization.

Figure 9:
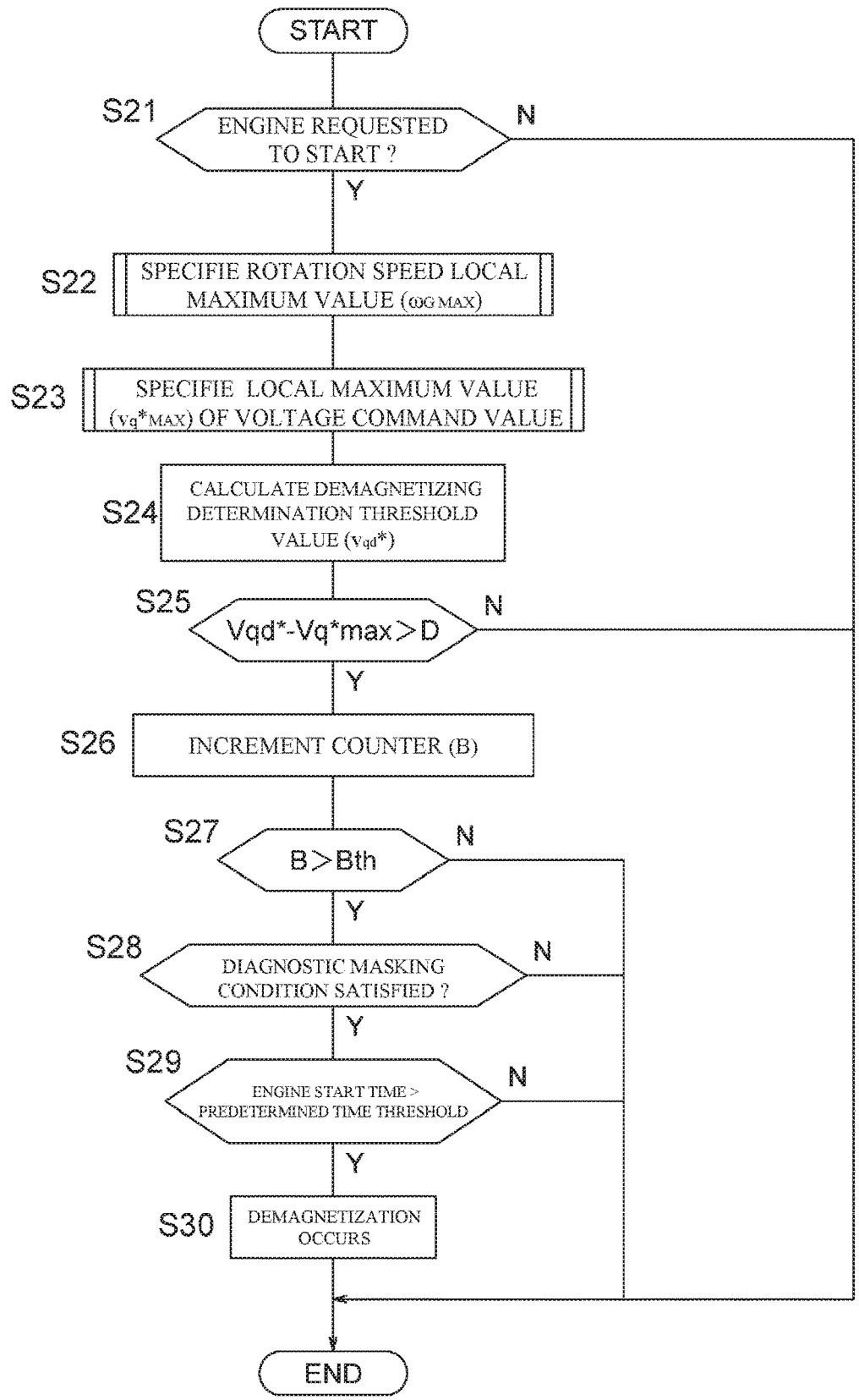
FIG. 9 is a flowchart showing a control flows of demagnetizing determination by controller.

With reference to FIG. 9, illustrating the control of the demagnetizing determination by controller 100. In step S21, the controller 100 determines whether or not the engine has been requested to start the engine. For example, when an acceleration is requested by the accelerator operation and the engine power is required, the controller 100 determines that there is a start request of the engine. The controller 100 also launches torque command value to start the engine. The controller 100 starts measuring the engine start time. Incidentally, the controller 100 uses the engine rotation speed sensor (not shown) after starting up torque command value to detect the engine speed. Then, the time from the start of engine rotation until the detected rotation speed reaches the rotation speed threshold indicating complete explosion is calculated as the engine start time.

The control processing from step S22 to step S28 is the same as the control processing from step S1 to step S7 shown in FIG. 5, and therefore the explanation thereof is omitted.

In step S29, the controller 100 determines whether or not the engine start time is longer than a predetermined time threshold. The predetermined time threshold is set in advance, and is set to a time longer than the engine start time when the demagnetization is not occurring.

When determining that the engine start time is longer than the time threshold, the demagnetization determiner 42 determines that demagnetization occurs in step S30, When determining that the engine start time is equal to or less than the time threshold, the demagnetization determiner 42 determines that the demagnetization does not occur, and terminates the control flow.

In the present embodiment as described above, the controller 100 measures the start time of the engine 10 connected to motor 3 and determines whether demagnetization of the magnet occurs based on the start time. Thus, it is possible to increase accuracy of the demagnetizing determination.

Incidentally, the present embodiment, since the condition of the engine start time is added to the determination logic of the demagnetization, the magnitude of the predetermined threshold value (D), may be smaller than the value set in the first embodiment (D).

Although the hybrid vehicle of the rear wheel drive is exemplified in FIG. 7, it may be a hybrid vehicle of the front wheel drive or a hybrid vehicle of the four-wheel drive. The hybrid system may be of a series type.

Third Embodiment

Inverter control method and inverter control apparatus according to another embodiment of the present invention will be described. In the present embodiment, with respect to the first embodiment, it differs in that a part of the control flows of the demagnetizing determination is added. Other configurations and control method are the same as the first embodiment described above, the description of the first embodiment and the second embodiment is appropriately incorporated.

Figure 10:
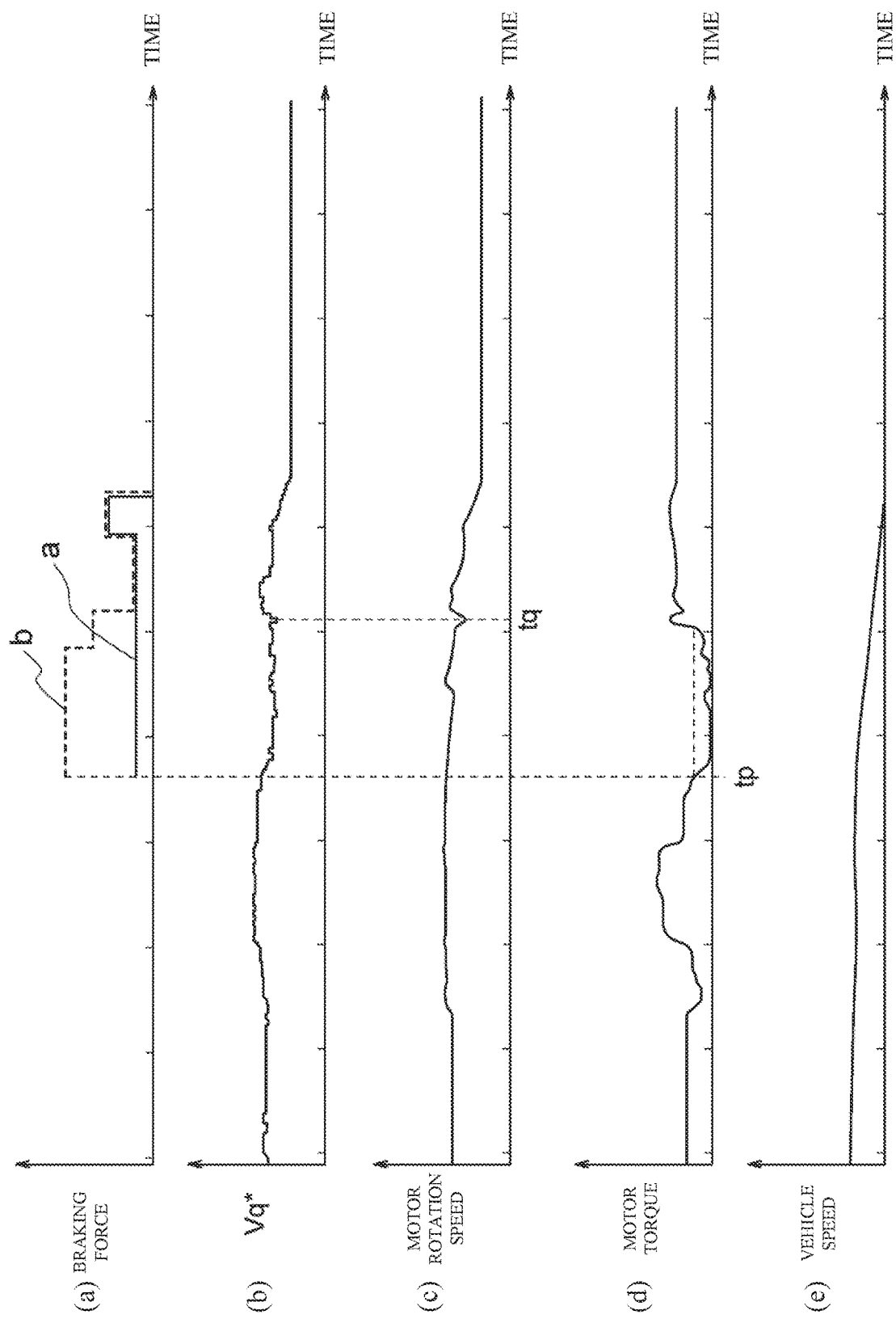
FIG. 10 is graphs the characteristics of the braking force, the characteristics of the voltage command value ($v_q^*$), the characteristics of motor rotation speed, the characteristics of the motor torque, and the characteristics of a vehicle speed.

FIG. 10 is a graph showing the characteristics of the braking force, the voltage command value ($v_q^*$), the motor rotation speed, the motor torque, and the vehicle speed. The horizontal axis shows time. Solid lines show the characteristics at normal, dotted lines show the characteristics at the time that the demagnetization occurs.

When vehicle is running, the drivers perform the braking operation at the time of $t_p$. With the brake operation, the signal of the brake switch changes from low level to high level, the control for decelerating starts. The controller 100 generates regenerative torque for the motor 3 to recover kinetic energy during vehicle deceleration when the regenerative control command is input. At this time, when the demagnetization does not occur in the motor 3, the motor 3 can generate a normal regenerative braking force. The braking force of the brake (mechanical brake) is obtained by subtracting the regenerative braking force of motor 3 from the braking force for the deceleration request. Therefore, when motor 3 is normal, the braking force of the brake is small (see graph a in FIG. 10).

On the other hand, when the demagnetization occurs, since the regenerative braking force of motor 3 is decreased, the braking force of the brake is increased as compared with the normal state (see graph b in FIG. 10). Also, motor rotation speed decreases by decreasing vehicle speed and becomes local minimal at the time $t_q$ in order to correspond to the minimum point of voltage command value ($v_q^*$). That is, the voltage command value ($v_q^*$) changes to follow motor rotation speed. In the present embodiment, in the following control flow, the condition of the braking force is added to the determination logic of demagnetization.

Figure 11:
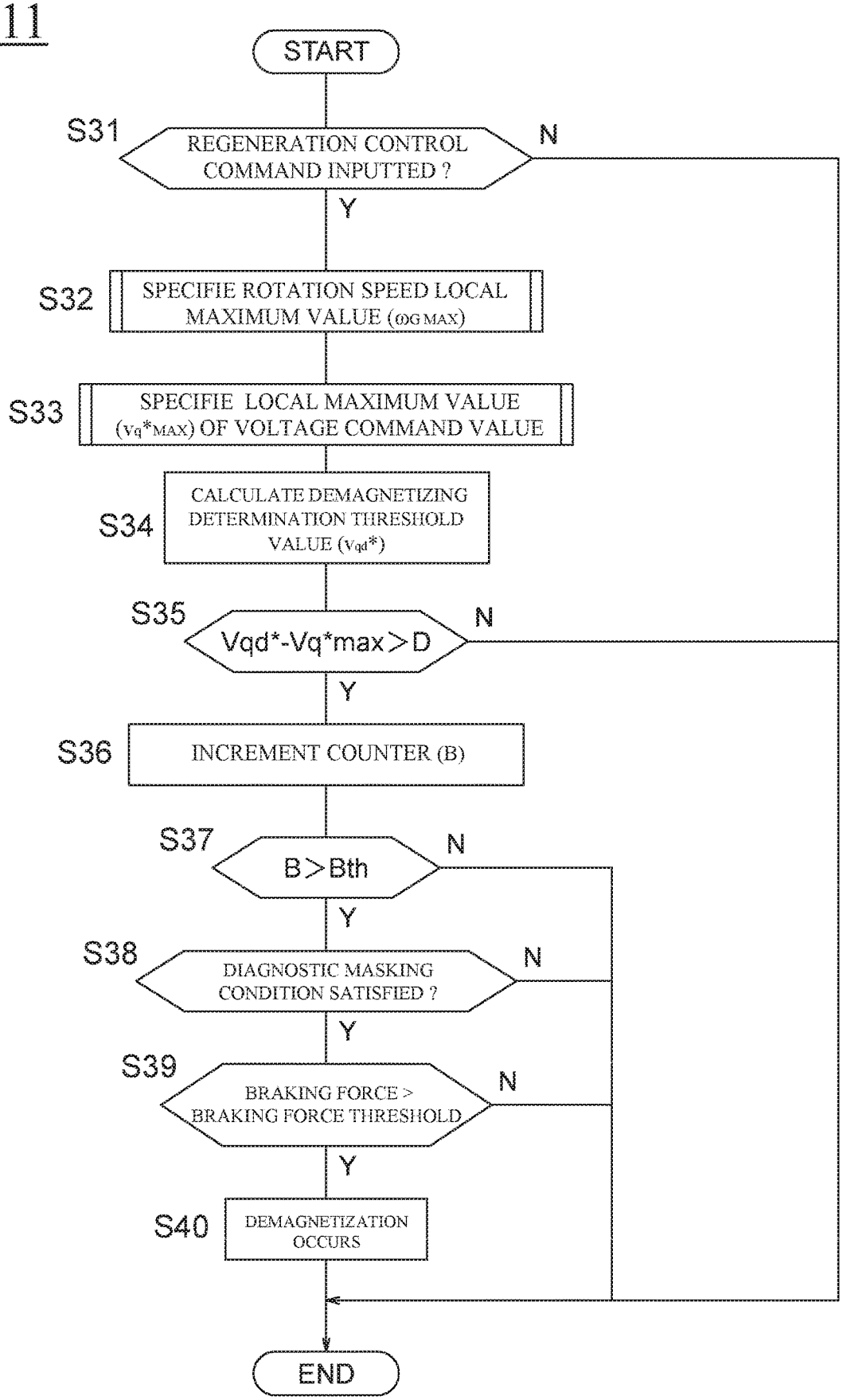
FIG. 11 is a flowchart showing control flows of demagnetizing determination by controller.

With reference to FIG. 11, the control of the demagnetizing determination by controller 100 will be described. In step S31, the controller 100 determines whether or not a regeneration control command is inputted. When determining that the regeneration control command is inputted, the process proceeds to step S32. The control flow is terminated when determining that there is no input of the regenerative control command.

Since the control processing from step S32 to step S38 is the same as the control processing from step S1 to step S7 shown in FIG. 5, the explanation thereof is omitted.

In step S39, the controller 100 determines that whether or not the braking force of the brake is larger than a predetermined t braking force threshold.

Then, when the braking force of the brake is greater than the braking force threshold, the demagnetization determiner 42 determines that demagnetization occurs. When the braking force of the brake is determined to be less than or equal to the braking force threshold, the demagnetization determiner 42 determines that the demagnetization does not occur, and terminates the control flow.

In the present embodiment as described above, whether or not the demagnetization of the magnet occurs is determined based on the braking force of the brake when vehicle speed is changed. Thus, it is possible to increase accuracy of the demagnetizing determination.

Incidentally, as a modification of the present embodiment, torque command value when vehicle speed is decreased may be added to the determination logic of demagnetization. As shown in FIG. 10 (d), in a case in which the motor 3 is regenerated, when the demagnetization occurs, because the torque command value of the regenerative direction is lower than normal torque command value, it is possible to determine the demagnetization based on the torque command value.

Specifically, in the control process of step S39 shown in FIG. 11, the controller 100 determines whether or not torque command value is smaller than a predetermined torque command value threshold. When the torque command value is less than the torque command value threshold, the controller 100 determines that demagnetization occurs. On the other hand, when the torque command value is equal to or greater than the torque command value threshold, the controller 100 determines that demagnetization does not occur, and terminates the control flow.

As another modification of the present embodiment, torque command value when vehicle speed is increased may be added to the determination logic of demagnetization. In a case in which the motor 3 drives in powering operation, when demagnetization occurs, because torque command value of the power operating direction is lower than the normal torque command value, it is possible to determine the demagnetization based on torque command value.

As described above, in the modification of the present embodiment, whether or not demagnetization of the magnets occurs is determined based on torque command value. Thus, it is possible to increase accuracy of the demagnetizing determination.

Fourth Embodiment

Inverter control method and inverter control apparatus according to another embodiment of the present invention will be described. This embodiment differs from the first embodiment in that an update function of the map used for calculating the determination threshold is added. Other configurations and control method are the same as the above-described first embodiment, and the description of the first to third embodiments is appropriately incorporated.

The controller 100 calculates the motor rotate voltage command value ($v_q^*$) based on motor revolution ($\omega_G$) at a predetermined period, and stores the motor revolution ($\omega_G$) and the torque voltage command value in association with each other in memory. The controller 100 also specifies, on the map, the torque voltage command value ($v_q^*$) corresponding to the current motor rotation ($\omega_G$) when a new torque voltage command value ($v_q^*$) is calculated based on the present motor revolution (G) of the present. The controller 100 compares the torque voltage command value ($v_q^*$) specified on the map with the newly calculated torque voltage command value ($v_q^*$) and sets the smaller torque voltage command value ($v_q^*$) as the new determination threshold ($v_{qd}^*$). The controller 100 stores the newly set determination threshold ($v_{qd}^*$) the map in association with motor rotation speed ($\omega_G$).

That is, when a new torque voltage command value ($v_q^*$) is calculated, the controller 100 selects the lower value between the torque voltage command value ($v_q^*$) stored as the determination threshold ($v_{qd}^*$) on the map and the newly calculated torque voltage command value ($v_q^*$) to set the lower torque voltage command value to the determination threshold (voltage command value), and updates the map.

Figure 12:
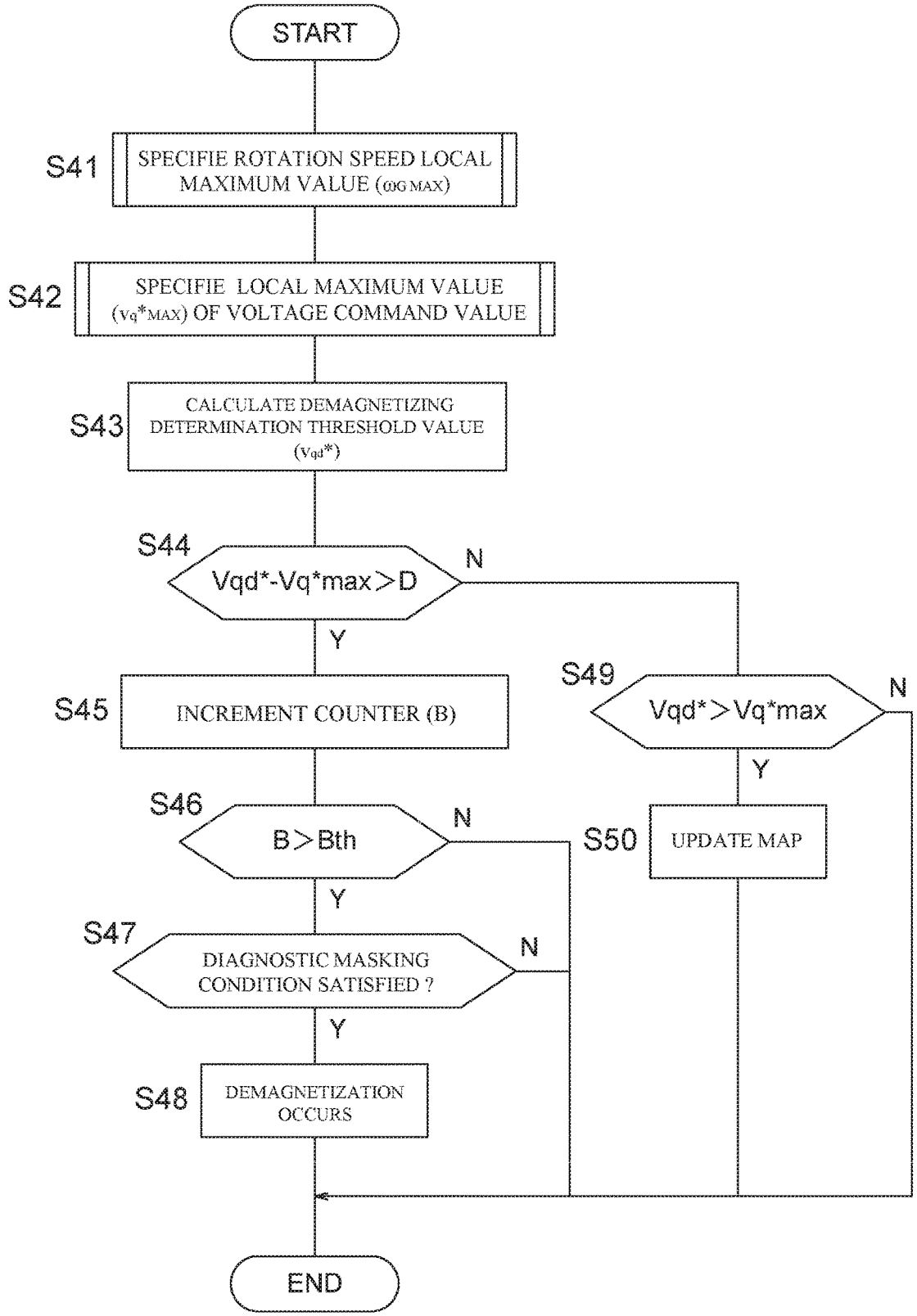
FIG. 12 is a flowchart showing control flows of demagnetizing determination by the controller.

Next, the control flows of controller 100 will be described. FIG. 12 is a flowchart illustrating a control flow of the controller 100. Since the control flows of step S41 to S48 are the same as the control flows of step S1 to S8 according to the first embodiment, the explanation thereof is omitted.

In step S44, when the difference ($v_{qd}^*-v_q^*_{MAX}$) from the local maximum value ($v_q^*_{MAX}$) of voltage command value is equal to or smaller than the threshold value (D), in step S49, the controller 100 specifies the determination threshold value ($v_{qd}^*$) corresponding to the present motor rotation speed while referring to the map. The controller 100 compares the specified determination threshold ($v_{qd}^*$) with the local maximum value ($v_q^*_{MAX}$) of the current voltage command value. When the local maximum value ($v_q^*_{MAX}$) of the current voltage command value local maximum is lower than the specified determination threshold ($v_{qd}^*$), the controller 100 sets the local maximum of the current voltage command ($v_q^*_{MAX}$) to the new determination threshold ($v_{qd}^*$) and updates the map in step S14. On the other hand, when the current maximum value ($v_q^*_{MAX}$) of voltage command value is equal to or greater than the specified determination threshold ($v_{qd}^*$), the controller 100 terminates the control flow without updating the map.

As described above, in the current embodiment, rotation state of motor 3 detected by the resolver 9 and the calculated torque voltage command value ($v_q^*$) are stored in memory 110 in association with each other, the torque voltage command value ($v_q^*$) is newly calculated based on the present rotation state, and the lower value of the newly calculated torque voltage command value ($v_q^*$) and the torque voltage command value ($v_q^*$) stored in memory 110 is set as the determination threshold ($v_{qd}^*$). Thus, the individual variation of the inverter 2 or the motor 3, while managing the decrease in torque voltage command value (vq*) due to variations in temperature properties of the inverter 2 or the motor 3 or the like, the determination threshold ($v_{qd}^*$) is updated. It is possible to increase the determination accuracy.

DESCRIPTION OF REFERENCE NUMERALS

1 Battery
2 Inverter
3 Motor
4 Reduction gear
5. Drive wheel
7 Relay switch
8 Current sensor
9 Resolvers
10 Engine
11 1st clutch
12 Second clutch
13 Propeller shaft
4 Differential gear unit
15 Drive shaft
17 Automatic transmission
20 Inverter Circuitry
21,23,25 Upper arm element
22,24,26 Lower arm element
27 Smooth capacitor
28 Discharge resistance
29 Discharge switch
30 Drive circuit
31 Revolution controller
32 . . . Current command calculator
33 Current controller
34 Decoupling controller
35 Two-phase three-phase voltage converter
36 Rotation speed calculator 37 Three-Phase Two-Phase current Converter
41 Determination threshold calculator
42 Demagnetization determiner
50 Clutch
52 Pole position detector
70 Continuously variable transmission
100 Controller
110 Memory
120 CPU

The invention claimed is:

1. A control method of inverter for driving motor including a magnet, comprising:
    detecting a rotation state of the motor by a rotation sensor;
    detecting current of the motor by a current sensor;
    calculating, based on a torque command value, a detection value of the rotation state detected by the rotation sensor, and detection current detected by the current sensor, a voltage command value for controlling a voltage of the motor by a controller for controlling the inverter;
    specifying a value of at least one of a local maximum value and a local minimum value of the torque voltage command value included in the voltage command value as a torque determination target command value by the controller;
    comparing a demagnetizing determination threshold value with the torque determination target command value by the controller; and
    determining whether or not demagnetization of the magnet occurs in accordance with the compared result.

2. The inverter control method according to claim 1, further comprising measuring a start time of an engine connected to the motor, and
    wherein the whether or not demagnetization of the magnet occurs is determined, based on the starting time by the controller.

3. The inverter control method according to claim 1, wherein the whether or not demagnetization of the magnet occurs is determined based on a braking force of a brake at the time that vehicle speed changes.

4. The inverter control method according to claim 1, wherein the whether or not demagnetization of the magnet occurs is determined based on the torque command value at the time that vehicle speed changes by the controller.

5. The inverter control method according to claim 1, wherein the method executed by the controller including:
    storing the rotation state detected by rotation sensor and the calculated voltage command value in association with each other in a memory,
    newly calculating the voltage current command value based on a present rotation state, and
    setting the lower one of the voltage command value newly calculated and the voltage command value stored in the memory as the demagnetizing determination threshold value.

6. The inverter control method according to claim 1, wherein the method executed by the controller including,
    obtaining the detection value corresponding to the determination target command value from rotation sensor, and
    setting the demagnetizing determination threshold value based on the detection value corresponding to the determination target command value.

7. An inverter controller for driving motor including a magnet, comprising:
    a rotation sensor for detecting a rotation state of the motor;
    a current sensor for detecting current of the motor; and
    a controller for controlling an inverter;
    wherein the controller configured to:
    calculate, based on a torque command value, a detection value of the rotation state detected by the rotation sensor, and detection current detected by the current sensor, a voltage command value for controlling a voltage of the motor;
    specify a value of at least one of a local maximum value and a local minimum value of the torque voltage command value included in the voltage command value as a torque determination target command value;
    compare a demagnetizing determination threshold with the torque determination target command value; and
    determine whether or not demagnetization of the magnet occurs in accordance with the result of the compared result.

* * * * *